US012567638B2

(12) United States Patent
Patil et al.

(10) Patent No.: US 12,567,638 B2
(45) Date of Patent: Mar. 3, 2026

(54) MODULAR CELL HOLDER ASSEMBLY FOR A RECHARGEABLE ENERGY STORAGE SYSTEM

(71) Applicant: GM Global Technology Operations LLC, Detroit, MI (US)

(72) Inventors: Chinmaya Patil, South Lyon, MI (US); Venkata Prasad Atluri, Novi, MI (US); Teresa U. Holiness-Stalling, Detroit, MI (US); John Patrick Spicer, Plymouth, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 633 days.

(21) Appl. No.: 18/086,032

(22) Filed: Dec. 21, 2022

(65) Prior Publication Data

US 2024/0213611 A1 Jun. 27, 2024

(51) Int. Cl.
| | |
|---|---|
| *H01M 50/258* | (2021.01) |
| *H01M 50/204* | (2021.01) |
| *H01M 50/249* | (2021.01) |
| *H01M 50/262* | (2021.01) |
| *H01M 50/531* | (2021.01) |

(52) U.S. Cl.
CPC ....... *H01M 50/258* (2021.01); *H01M 50/204* (2021.01); *H01M 50/249* (2021.01); *H01M 50/262* (2021.01); *H01M 50/531* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2010/0047676 A1* | 2/2010 | Park | ................... | H01M 50/271 |
| | | | | 429/93 |
| 2010/0178547 A1* | 7/2010 | Li | ....................... | H01M 50/258 |
| | | | | 429/151 |
| 2021/0005865 A1* | 1/2021 | Yang | ................... | H01M 50/258 |
| 2021/0098759 A1* | 4/2021 | Herron | ................ | H01M 50/276 |

FOREIGN PATENT DOCUMENTS

| | | | | | |
|---|---|---|---|---|---|
| CN | 206628565 U | * | 11/2017 | | |
| CN | 213242745 U | * | 5/2021 | | |
| DE | 202005010708 U1 | * | 9/2005 | .......... | H01M 50/227 |

OTHER PUBLICATIONS

Machine Translation of CN213242745U. (Year: 2020).*
Machine Translation of DE-202005010708-U1 (Year: 2005).*
Machine Translation of CN-206628565-U (Year: 2017).*

* cited by examiner

*Primary Examiner* — Gregg Cantelmo
(74) *Attorney, Agent, or Firm* — CANTOR COLBURN LLP

(57) ABSTRACT

A modular cell holder assembly includes a first cell holder member including a first cell receptacle and a second cell holder member including a second cell receptacle. The second cell holder member is connected with the first cell holder member forming a modular cell holder with the first cell receptacle and the second cell receptacle combining to form a cell receiving zone. A plurality of current connectors is provided on an outer surface of one of the first cell holder member and the second cell holder member. The plurality of current connectors is configured to establish a selected electrical configuration of energy storage cells in the cell receiving zone.

20 Claims, 8 Drawing Sheets

MODULAR CELL HOLDER ASSEMBLY FOR A RECHARGEABLE ENERGY STORAGE SYSTEM

INTRODUCTION

The subject disclosure relates to the art of rechargeable energy storage systems and, more particularly, to a modular cell holder assembly for a rechargeable energy storage system.

Rechargeable energy storage systems (RESS) rely on multiple energy storage cells to store electrical energy. The storage cells are typically arranged in a housing and supported by plates. The plates are spaced from the housing to provide cooling channels. Groups of cells are connected in series and/or parallel to create a selected energy output. Cell groups are often isolated from one another. The structure required to support, maintain, and cool multiple energy storage cells is component intensive and difficult to service. Accordingly, it is desirable to provide a system for supporting and housing energy storage cells that is easy to manufacture, easy to assemble, and easy to maintain than current designs.

SUMMARY

A modular cell holder assembly for a rechargeable energy storage device, in accordance with a non-limiting example, includes a first cell holder member including a first cell receptacle and a second cell holder member including a second cell receptacle. The second cell holder member is connected with the first cell holder member forming a modular cell holder with the first cell receptacle and the second cell receptacle combining to form a cell receiving zone. A plurality of current connectors is provided on an outer surface of one of the first cell holder member and the second cell holder member. The plurality of current connectors is configured to establish a selected electrical configuration of energy storage cells in the cell receiving zone.

In addition to one or more of the features described herein a plurality of energy storage cells is arranged in the cell receiving zone, the plurality of energy storage cells being electrically connected through the plurality of current connectors.

In addition to one or more of the features described herein the first cell holder member includes a first base wall and a first plurality of side walls that define the first cell receptacle, the first base wall including a first inner surface exposed to the first cell receptacle and a first outer surface.

In addition to one or more of the features described herein the second cell holder member includes a second base wall and a second plurality of side walls that define the second cell receptacle, the second base wall including a second inner surface exposed to the second cell receptacle and a second outer surface.

In addition to one or more of the features described herein a first snap connector extends from the first inner surface of the first base wall and a second snap connector extending from the second inner surface of the second base wall, the first cell holder member being snap-fit to the second cell holder member through the first snap connector and the second snap connector to form the modular cell holder assembly.

In addition to one or more of the features described herein the modular cell holder includes a first side surface including a first connector member, a second side surface opposite the first side surface including a second connector member, a first end surface, and a second end surface opposite the first end surface.

In addition to one or more of the features described herein a plurality of modular cell holders are connected to one another by joining the first connector member of select ones of the plurality of modular cell holders with the second connector member on others of the select ones of the plurality of modular cell holders to form a cell holder module, wherein the first outer surface of each first base wall collectively define a first exterior surface of the cell holder module and the second outer surface of each second base wall collectively define a second exterior surface of the cell holder module.

In addition to one or more of the features described herein the first side surface of one of the plurality of modular cell holders forms a first outer side of the cell holder module, the second side surface of another of the plurality of modular cell holders forms a second outer side of the cell holder module, the first end surface of each of the plurality of modular cell holders forms a first outer end of the cell holder module and each the second end surface of each of the plurality of modular cell holders forms a second outer end of the cell holder module.

In addition to one or more of the features described herein the plurality of current connectors are mounted in a current connector plate arranged on the first outer surface, the plurality of current connectors being connected to each of the plurality of energy storage cells in each modular cell holder.

In addition to one or more of the features described herein each of the first cell holder member and the second cell holder member are formed from structural foam.

A vehicle, in accordance with a non-limiting example, includes a body defining a passenger compartment, an electric motor supported relative to the body, and a rechargeable energy storage system (RESS) operatively connected to the electric motor. The RESS includes a modular cell holder assembly includes a first cell holder member including a first cell receptacle and a second cell holder member including a second cell receptacle. The second cell holder member is connected with the first cell holder member forming a modular cell holder with the first cell receptacle and the second cell receptacle combining to form a cell receiving zone. A plurality of current connectors is provided on an outer surface of one of the first cell holder member and the second cell holder member. The plurality of current connectors is configured to establish a selected electrical configuration of energy storage cells in the cell receiving zone.

In addition to one or more of the features described herein a plurality of energy storage cells is arranged in the cell receiving zone, the plurality of energy storage cells being electrically connected through the plurality of current connectors.

In addition to one or more of the features described herein the first cell holder member includes a first base wall and a first plurality of side walls that define the first cell receptacle, the first base wall including a first inner surface exposed to the first cell receptacle and a first outer surface.

In addition to one or more of the features described herein the second cell holder member includes a second base wall and a second plurality of side walls that define the second cell receptacle, the second base wall including a second inner surface exposed to the second cell receptacle and a second outer surface.

In addition to one or more of the features described herein a first snap connector extending from the first inner surface of the first base wall and a second snap connector extending from the second inner surface of the second base wall, the first cell holder member being snap-fit to the second cell holder member through the first snap connector and the second snap connector to form the modular cell holder.

In addition to one or more of the features described herein the modular cell holder includes a first side surface including a first connector member, a second side surface opposite the first side surface including a second connector member, a first end surface, and a second end surface opposite the first end surface.

In addition to one or more of the features described herein a plurality of modular cell holders are connected to one another by joining the first connector member of select ones of the plurality of modular cell holders with the second connector member on others of the select ones of the plurality of modular cell holders to form a cell holder module, wherein the first outer surface of each first base wall collectively define a first exterior surface of the cell holder module and the second outer surface of each second base wall collectively define a second exterior surface of the cell holder module.

In addition to one or more of the features described herein the first side surface of one of the plurality of modular cell holders forms a first outer side of the cell holder module, the second side surface of another of the plurality of modular cell holders forms a second outer side of the cell holder module, the first end surface of each of the plurality of modular cell holders forms a first outer end of the cell holder module and each the second end surface of each of the plurality of modular cell holders forms a second outer end of the cell holder module.

In addition to one or more of the features described herein the plurality of current connectors are mounted in a current connector plate arranged on the first outer surface, the plurality of current connectors being connected to each of the plurality of energy storage cells in each cell holder assembly.

In addition to one or more of the features described herein each of the first cell holder member and the second cell holder member are formed from structural foam.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
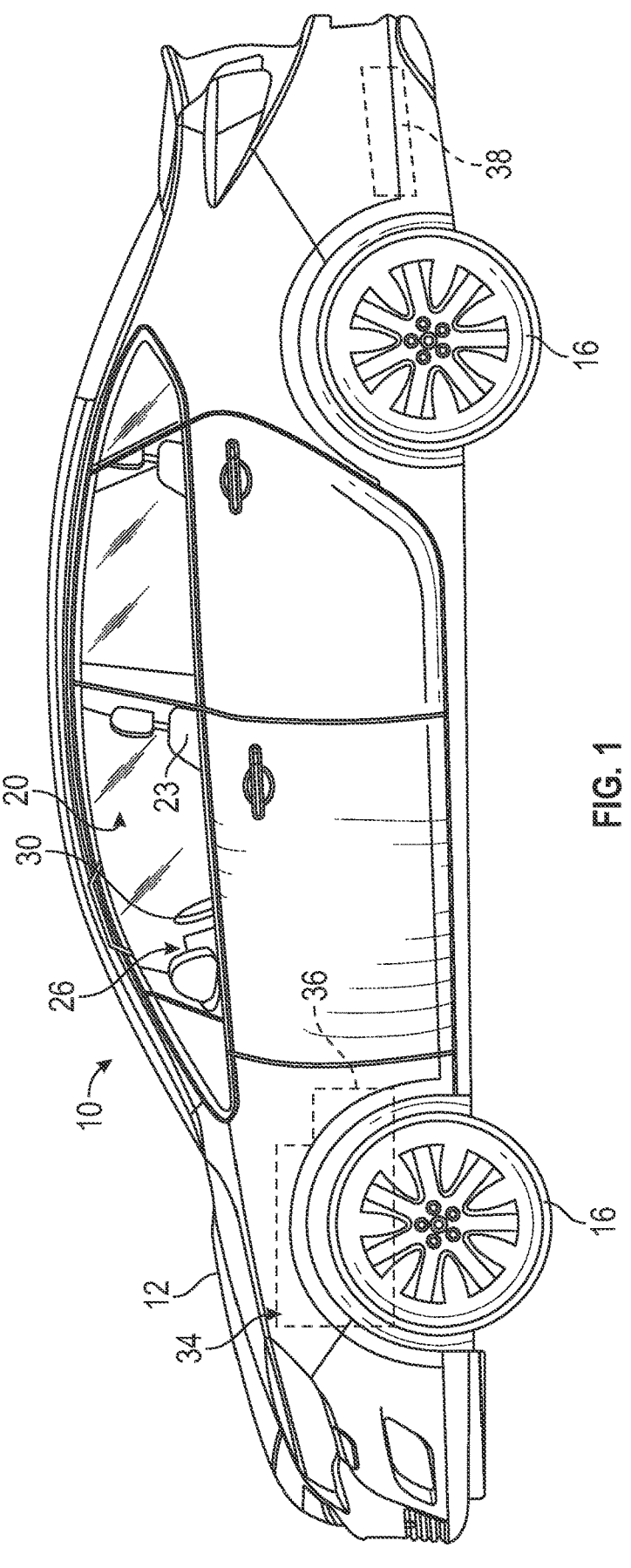
FIG. 1 is a left side view of a vehicle including a rechargeable energy storage system having a modular cell holder assembly, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Two of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
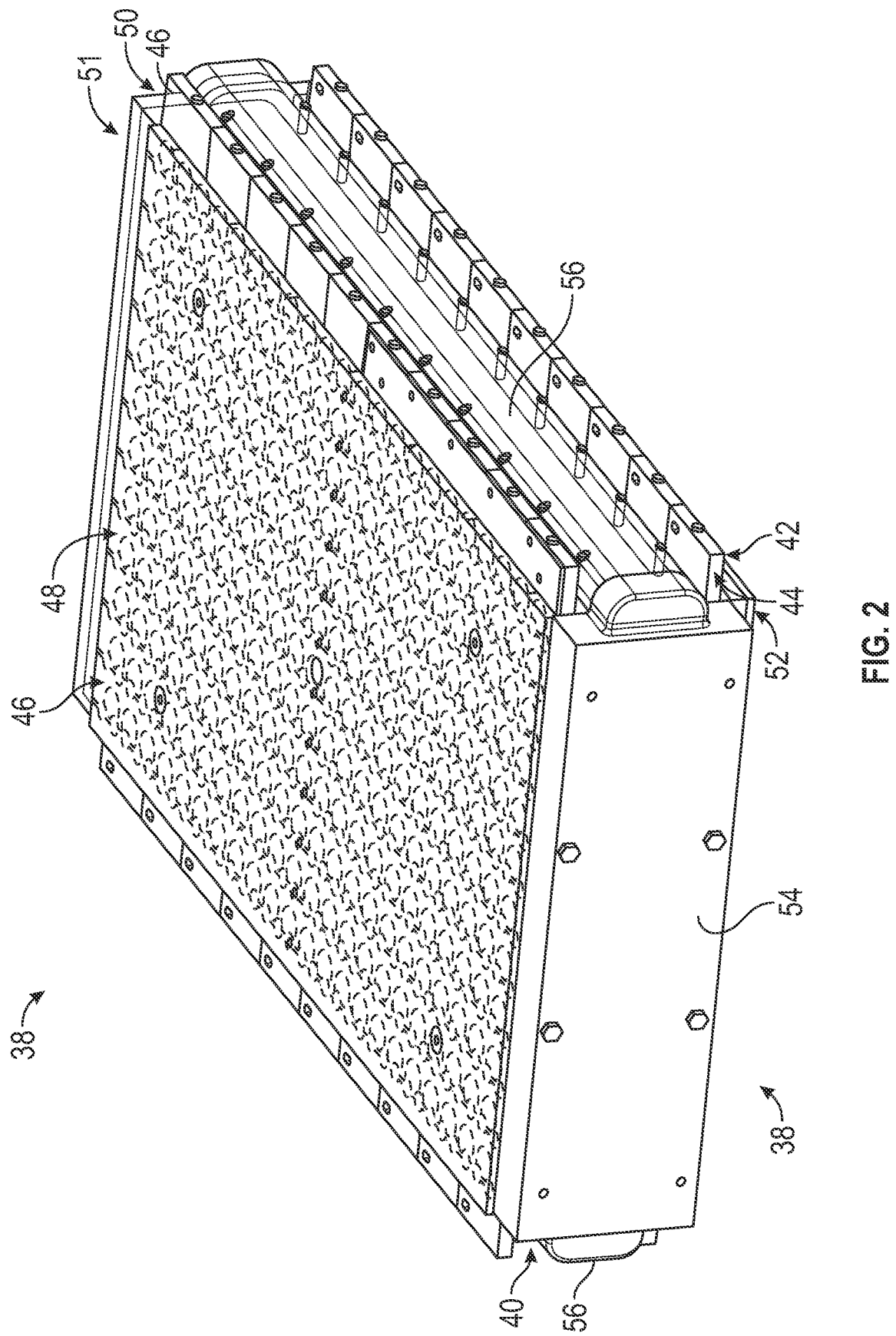
FIG. 2 is a perspective view of the modular cell holder assembly, in accordance with a non-limiting example.
Figure 3:
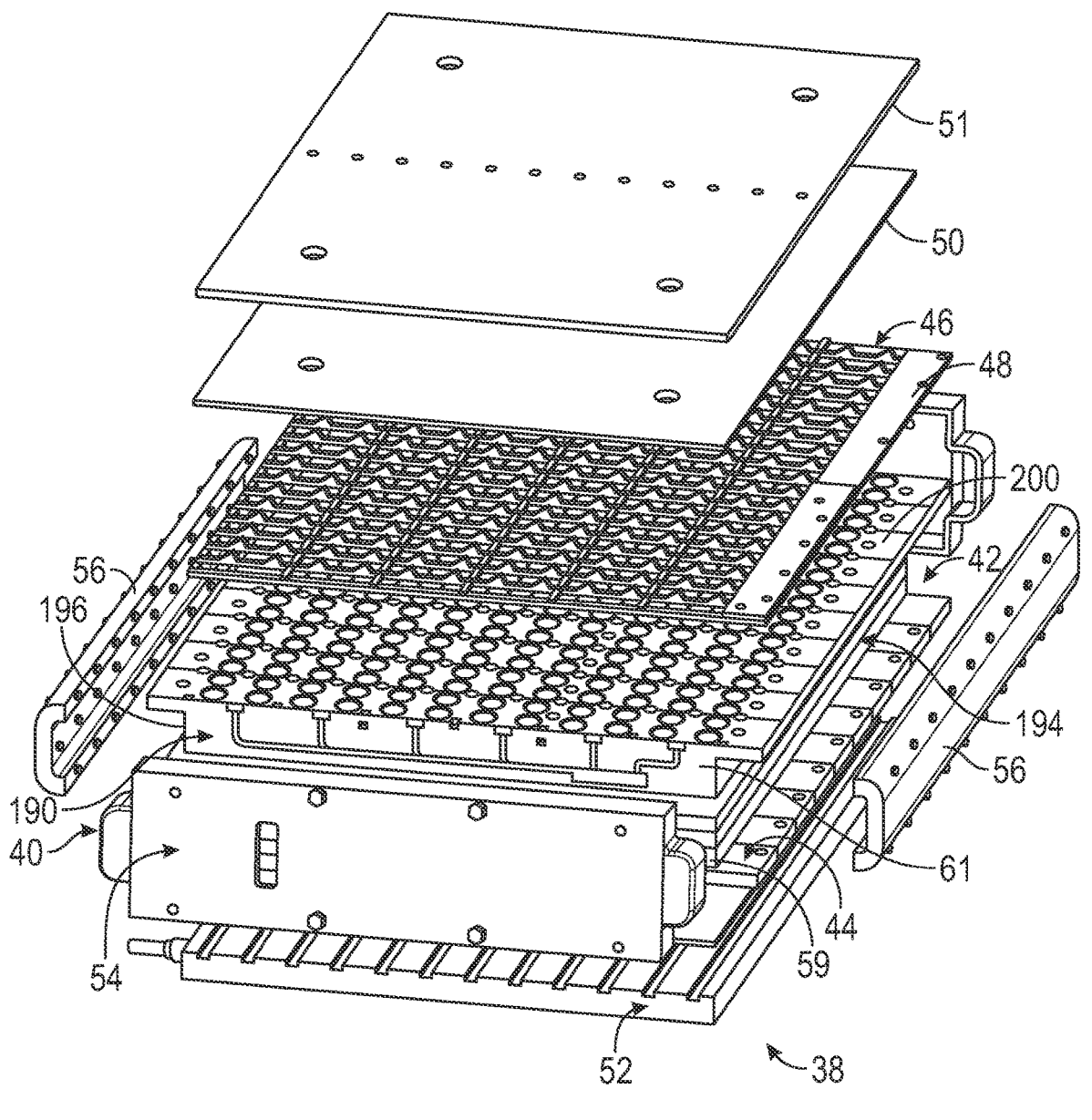
FIG. 3 is a disassembled view of the modular cell holder assembly of FIG. 2, in accordance with a non-limiting example.

Vehicle 10 includes an electric motor 34 connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary. Referring to FIGS. 2 and 3, RESS 38 includes a modular cell holder assembly 40 including a cell holder module 42 formed from a plurality of modular cell holders 44.

Modular cell holder assembly 40 includes a current connector plate 46 supporting a plurality of electrical connectors or jumpers indicated generally at 48 which, as will be detailed more fully herein, establish a selected electrical configuration for RESS 38. In addition to current connector plate 46, modular cell holder assembly 40 includes a thermal runaway protection (TRP) plate 50, a cover 51, and a cold plate 52. A battery control module 54 and sensor wire routing modules 56 are also connected to cell holder module 42.

Figure 4:
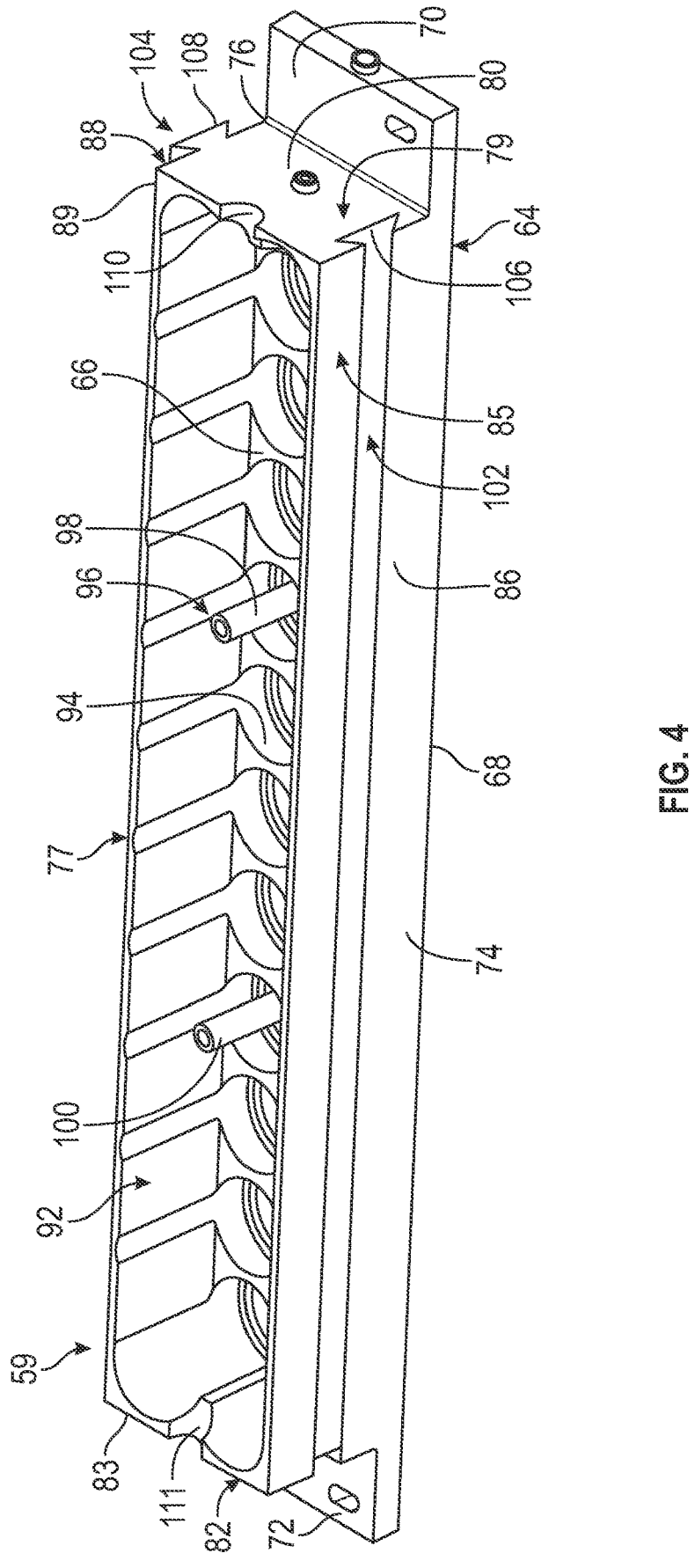
FIG. 4 is a perspective view of a cell holder member of the modular cell holder assembly of FIG. 2, in accordance with a non-limiting example.
Figure 5:
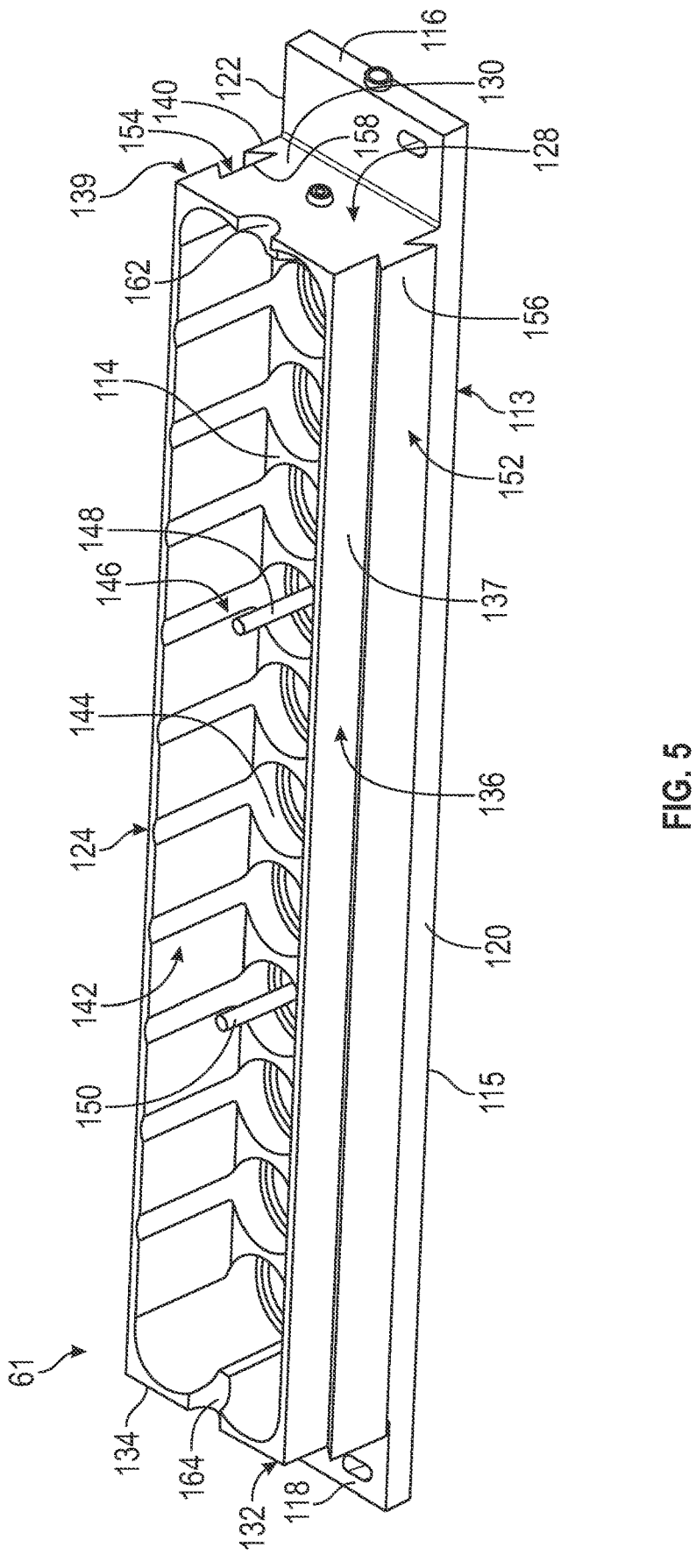
FIG. 5 is a perspective view of another cell holder of the modular cell holder assembly of FIG. 2, in accordance with a non-limiting example.

Referring to FIGS. 4 and 5 and with continued reference to FIG. 3, each modular cell holder 44 is formed from a first cell holder member 59 (FIG. 4) and a second cell holder member 61 (FIG. 5). In accordance with a non-limiting example, first cell holder member 59 includes a first base wall 64 having a first inner surface 66 and a first outer surface 68. First base wall 64 includes a first end 70, a second end 72 that is opposite first end 70, a first side edge 74 and a second side edge 76 that is opposite to first side edge 74. A first plurality of side walls 77 project outwardly from first inner surface 66 of first base wall 64.

In accordance with a non-limiting example, first plurality of side walls 77 includes a first end wall 79 defining a first end wall surface 80, a second end wall 82 defining a second end wall surface 83 that is opposite first end wall surface 80. First plurality of side walls 77 further includes a first side wall 85 defining a first side surface 86 and a second side wall 88 defining a second side surface 89. First and second side walls 85 and 88 extend between and connect with first and second end walls 79 and 82. First inner surface 66 and first plurality of side walls 77 define a first cell receptacle 92. First inner surface 66 includes a first plurality of cell retainers, one of which is indicate at 94.

A first snap connector 96, shown in the form of a first post 98 and a second post 100 project outwardly from first inner surface 66 within first cell receptacle 92. First side surface 86 includes a first connector member 102 and second side surface 89 includes a second connector member 104. First connector member 102 takes the form of a first slot or first dovetail receiver 106 and second connector member 104 takes the form of a second projection or second dovetail member 108. Second dovetail member 108 on first cell holder member 59 connects with a dovetail receiver on another first cell holder member as will be discussed herein. In addition, first end wall 79 includes a first recess 110 and second end wall 82 includes a second recess 111.

Second cell holder member 61, as shown in FIG. 5, includes a second base wall 113 including a second inner surface 114 and a second outer surface 115. Second base wall 113 also includes a first end portion 116, a second end portion 118 that is opposite to first end portion 116, a first side edge portion 120 and a second side edge portion 122 that is opposite to first side edge portion 120. Second cell holder member 61 includes a second plurality of side walls 124 that project from second inner surface 114 of second base wall 113.

In accordance with a non-limiting example, second plurality of side walls 124 includes a first end wall member 128 that is spaced from first end portion 116 defining a first end wall surface portion 130 and a second end wall member 132 spaced from second end portion 118 defining a second end wall surface portion 134. Second plurality of side walls 124 further includes a first side wall member 136 defining a first side wall surface portion 137 and a second side wall side wall member 139 defining a second side wall surface portion 140. First and second side wall members 136 and 139 extend between and connect with first end wall member 128 and first end wall surface portion 130. Second plurality of side walls 124 collectively define a second cell receptacle 142. That is, second inner surface 114 includes a second plurality of cell retainers, one of which is indicate at 144.

A second snap connector 146, shown in the form of a first pin 148 and a second pin 150 project outwardly from second inner surface 114 within second cell receptacle 142. First and second pins 148 and 150 snap-fittingly connect with first and second posts 98 and 100 to detachably couple first cell holder member 59 and second cell holder member 61.

In a non-limiting example, first side wall surface portion 137 includes a first connector element 152 and second side wall surface portion 140 includes a second connector element 154. First connector element 152 takes the form of a second dovetail member 156 and second connector element 154 takes the form of a second recess or second dovetail receiver 158. Second dovetail member 108 on first cell holder member 59 connects with a dovetail receiver on another first cell holder member. In addition, first end wall member 128 includes a first recess portion 162 and second end wall member 132 includes a second recess portion 164.

Figure 6:
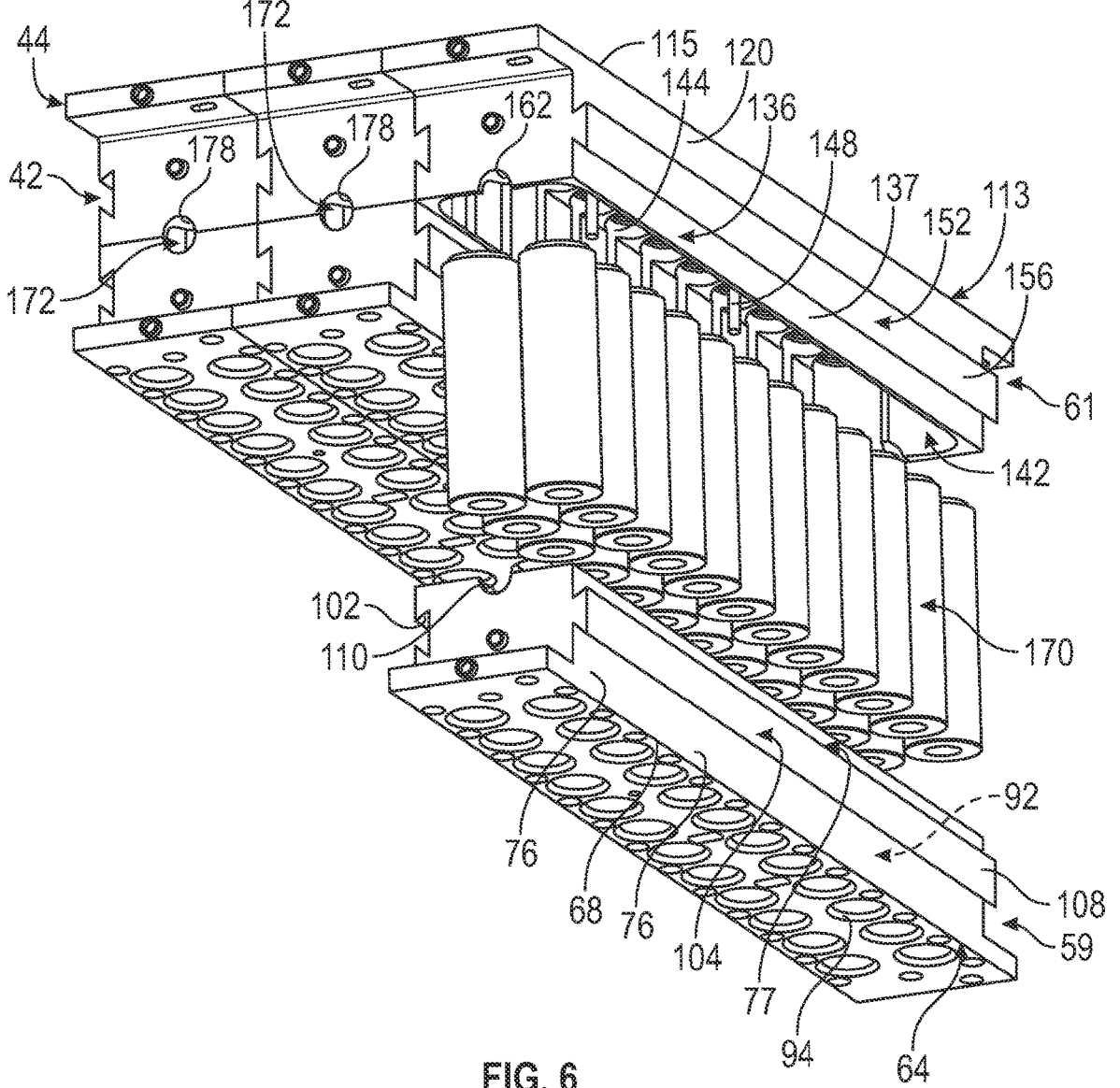
FIG. 6 is a disassembled view of a modular cell holder including the modular cell holder assembly of FIG. 4 being connected to another modular cell holder assembly of FIG. 5 together with energy storage cells, in accordance with a non-limiting example.

Referring to FIG. 6 and with continued reference to FIGS. 4 and 5, a plurality of energy storage cells 170 are arranged in first cell retainer 92 and positioned in each of the first cell receptacles 94 of first cell holder member 59. At this point, second cell holder member 61 may be connected to first cell holder member 59 such that the plurality of energy storage cells 170 are also arranged in each second cell retainer 144 of second cell receptacle 142. When first cell holder member 59 and second cell holder member 61 are brought together, first cell receptacle 92 and second cell receptacle 142 come together to form a cell receiving zone 172 therebetween. In a non-limiting example, a potting material (not shown) may be introduced into cell receiving zone 172 in order to retain and reduce vibrations of energy storage cells 170. When connected, first and second cell holder members 59 and 61 form a modular cell holder 44 having a first opening 178 formed by first recess 110 and first recess portion 162 and a second opening (not shown) formed by second recess 111 and second recess portion 164. First opening 178 and the second openings provide passage for conductors into cell receiving zone 172.

Figure 7:
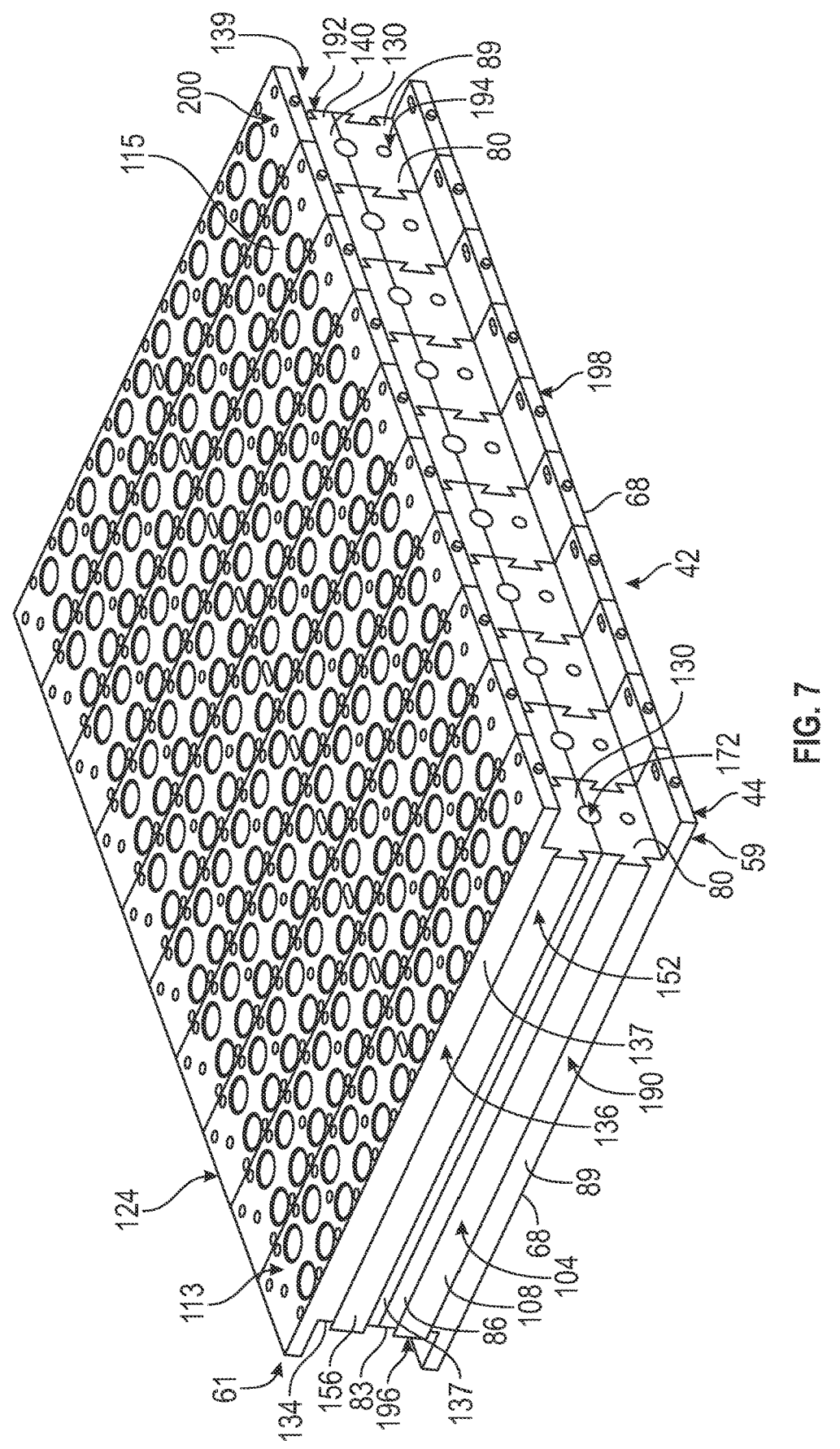
FIG. 7 depicts a plurality of modular cell holders joined together to form a cell holder module, in accordance with a non-limiting example.

As shown in FIG. 7, multiple modular cell holders 44 are joined together to form cell holder module 42. Modular cell holders 44 are joined by connecting first connector member 102 with first connector element 152 and second connector member 104 with second connector element 1542 on an adjacent modular cell holders 44. At this point, while a straight dovetail connection is show, tapered dovetails may also be used to simplify assembly by adding a space or clearance between mating parts during an initial connection that is reduced as the parts are brought together. Further, while a dovetail connection is shown, the particular connection between modular cell holders may vary and could include sliding interfaces, snap-fit interfaces, mechanical connectors, and the like.

In a non-limiting example, cell holder module 42 includes a first outer side 190, a second outer side 192 that is opposite first outer side 190, a first end surface 194, and a second end surface 196 that is opposite first end surface 194. First outer side 190 is formed by first side surface 86 of a first cell holder member 59 and first side wall surface portion 137 of a second cell holder member 61. Similarly, second outer side 192 is formed by second side surface 89 of another first cell holder member 59 and a second side wall surface portion 140 of another second cell holder member 61. Cell holder module 42 also includes a lower surface 198 formed by the first outer surface 68 of each first cell holder member 59 and an upper surface 200 formed by the second outer surfaces 115 of each second cell holder member 61. At this point, it should be understood that the terms upper and lower simply refer to the depiction of cell holder module 41 in FIG. 7 and should not be considered to be limiting in any way.

First end surface 194 is formed by first end wall surface 80 and first end wall surface portion 130 of each first and second cell holder member forming cell holder module 42. Second end surface 196 is formed by second end wall surface 83 and second end wall surface portion 134 of each first and second cell holder member forming cell holder module 42. First end surface 194 and second end surface 196 are recessed relative to lower surface 198 and upper surface 200.

Figure 8:
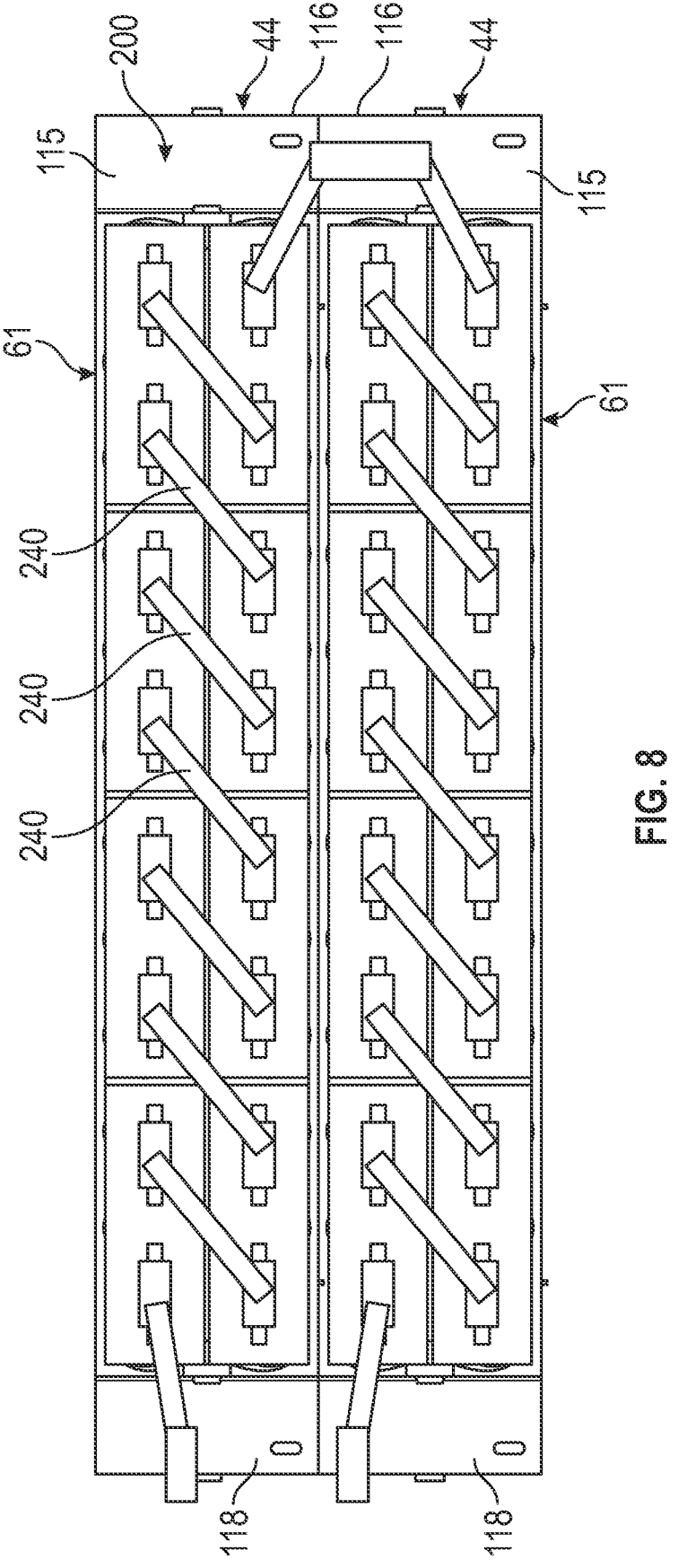
FIG. 8 depicts two cell holders of the modular cell holder assembly including integrated current connectors, in accordance with a non-limiting example.

In a non-limiting example, battery control module 54 may be connected to first outer side 190 as shown in FIG. 3. Sensor wire routing modules 56 may be mounted to first end surface 194 and second end surface 196 as also shown in FIG. 3. Sensor wire routing modules 56 may be nested in the recess formed at first end surface 194 and second end surface 196 in order to conserve space and create an overall smaller footprint. Cold plate 52 may be mounted to lower surface 198. In a non-limiting example, each of the plurality of energy storage cells 170 arranged in cell holder module 42 is connected in a selected electrical configuration by jumpers 48 provided in current connector plate 46 mounted to upper surface 200 as shown in FIG. 3. Current connector plate 46 may create series and/or parallel connections for energy storage cells 170 depending upon application specific requirements for RESS 38. In place of a separate cell holder plate, jumpers 240 may be molded to, for example second outer surface 115 of each second cell holder member 61 as shown in FIG. 8.

The cell holder module formed in accordance with the non-limiting examples described herein may be readily configured for a wide variety of applications without requiring a multitude of components. That is, modular cell holders may be formed and organized into a wide array of configurations to form a cell holder module for specific applications. Further, the cell holder module lends itself to repair by removing and replacing a modular cell holder(s) that may no longer be at peak performance.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A modular cell holder assembly for a rechargeable energy storage system defining a first direction, a second direction orthogonal to the first direction, and a third direction orthogonal to the first and second directions, the modular cell holder assembly comprising:
   a first modular cell holder; and
   a second modular cell holder positioned in the third direction with respect to the first modular cell holder and interlocked with the first modular cell holder,
   wherein the first modular cell holder comprises:

a first lower cell holder member including a first lower cell receptacle and comprising a first lower snap connector extending in the first direction within the first lower cell receptacle from a first lower base wall;
   a first upper cell holder member including a first upper cell receptacle and comprising a first upper snap connector extending in the first direction within the first upper cell receptacle from a first upper base wall,
   wherein the first lower cell holder member and the first upper cell holder member are connected by engaging the first lower snap connector with the first upper snap connector with the first lower cell receptacle and the first upper cell receptacle combining to form a first cell receiving zone,
   wherein the second modular cell holder comprises:
      a second lower cell holder member including a second lower cell receptacle and comprising a second lower snap connector extending in the first direction within the second lower cell receptacle from a second lower base wall;
      a second upper cell holder member including a second upper cell receptacle and comprising a second upper snap connector extending in the first direction within the second upper cell receptacle from a second upper base wall,
   wherein the second lower cell holder member and the second upper cell holder member are connected by engaging the second lower snap connector with the second upper snap connector with the second lower cell receptacle and the second upper cell receptacle combining to form a second cell receiving zone,
   wherein each of the first lower cell holder member, the first upper cell holder member, the second lower cell holder member, and the second upper cell holder member includes a first side wall having a dovetail slot extending in the second direction and a second side wall having a dovetail projection extending in the second direction,
   wherein the dovetail projection of the first lower member engages with the dovetail slot of the second lower member, and the dovetail projection of the first upper member engages with the dovetail slot of the second upper member to interlock the first modular cell holder and the second modular cell holder, and
   wherein a plurality of current connectors are provided on outer surfaces of the first cell holder and the second cell holder, the plurality of current connectors being configured to establish a selected electrical configuration of energy storage cells in the first and second cell receiving zones.

2. The modular cell holder assembly according to claim 1, further comprising a plurality of energy storage cells arranged in the first and second cell receiving zones, the plurality of energy storage cells being electrically connected through the plurality of current connectors.

3. The modular cell holder assembly according to claim 1, wherein the plurality of current connectors are mounted in a current connector plate arranged on upper surfaces of the first and second upper cell holder members, the plurality of current connectors being connected to each of the plurality of energy storage cells in the first and second modular cell holders.

4. The modular cell holder assembly according to claim 1, wherein each of the first lower cell holder member, the first upper cell holder member, the second lower cell holder member, and the second upper cell holder member are formed from structural foam.

5. The modular cell holder assembly according to claim 1, wherein the first and second side surfaces are opposite each other in the third direction.

6. The modular cell holder assembly according to claim 1, wherein each of the first lower cell holder member, the first upper cell holder member, the second lower cell holder member, and the second upper cell holder member includes a third side wall and a fourth side wall opposite each other in the second direction.

7. The modular cell holder assembly according to claim 6, wherein the third side wall includes a partial opening.

8. The modular cell holder assembly according to claim 7, wherein the partial opening of the first lower cell holder member and the partial opening of the first upper cell holder member combine to form a first conductor opening configured to provide passage of conductors into the first cell receiving zone.

9. The modular cell holder assembly according to claim 8, wherein the partial opening of the second lower cell holder member and the partial opening of the second upper cell holder member combine to form a second conductor opening configured to provide passage of conductors into the second cell receiving zone.

10. The modular cell holder assembly according to claim 1, wherein the dovetail slot spans an entirety of the first side wall in the second direction, and the dovetail projection spans an entirety of the second side wall in the second direction.

11. A vehicle comprising:
a body defining a passenger compartment;
an electric motor supported relative to the body; and
a rechargeable energy storage system (RESS) operatively connected to the electric motor, the RESS including a modular cell holder assembly defining a first direction, a second direction orthogonal to the first direction, and a third direction orthogonal to the first and second directions, the modular cell holder assembly comprising:
a first modular cell holder; and
a second modular cell holder positioned in the third direction with respect to the first modular cell holder and interlocked with the first modular cell holder,
wherein the first modular cell holder comprises:
a first lower cell holder member including a first lower cell receptacle and comprising a first lower snap connector extending in the first direction within the first lower cell receptacle from a first lower base wall;
a first upper cell holder member including a first upper cell receptacle and comprising a first upper snap connector extending in the first direction within the first upper cell receptacle from a first upper base wall,
wherein the first lower cell holder member and the first upper cell holder member are connected by engaging the first lower snap connector with the first upper snap connector with the first lower cell receptacle and the first upper cell receptacle combining to form a first cell receiving zone,
wherein the second modular cell holder comprises:
a second lower cell holder member including a second lower cell receptacle and comprising a second lower snap connector extending in the first direction within the second lower cell receptacle from a second lower base wall;
a second upper cell holder member including a second upper cell receptacle and comprising a second upper snap connector extending in the first direction within the second upper cell receptacle from a second upper base wall,
wherein the second lower cell holder member and the second upper cell holder member are connected by engaging the second lower snap connector with the second upper snap connector with the second lower cell receptacle and the second upper cell receptacle combining to form a second cell receiving zone,
wherein each of the first lower cell holder member, the first upper cell holder member, the second lower cell holder member, and the second upper cell holder member includes a first side wall having a dovetail slot extending in the second direction and a second side wall having a dovetail projection extending in the second direction,
wherein the dovetail projection of the first lower member engages with the dovetail slot of the second lower member, and the dovetail projection of the first upper member engages with the dovetail slot of the second upper member to interlock the first modular cell holder and the second modular cell holder, and
wherein a plurality of current connectors are provided on outer surfaces of the first cell holder and the second cell holder, the plurality of current connectors being configured to establish a selected electrical configuration of energy storage cells in the first and second cell receiving zones.

12. The vehicle according to claim 11, further comprising a plurality of energy storage cells arranged in the first and second cell receiving zones, the plurality of energy storage cells being electrically connected through the plurality of current connectors.

13. The vehicle according to claim 11, wherein the plurality of current connectors are mounted in a current connector plate arranged on upper surfaces of the first and second upper cell holder members, the plurality of current connectors being connected to each of the plurality of energy storage cells in the first and second modular cell holders.

14. The vehicle according to claim 11, wherein each of the first lower cell holder member, the first upper cell holder member, the second lower cell holder member, and the second upper cell holder member are formed from structural foam.

15. The vehicle according to claim 11, wherein the first and second side surfaces are opposite each other in the third direction.

16. The vehicle according to claim 11, wherein each of the first lower cell holder member, the first upper cell holder member, the second lower cell holder member, and the second upper cell holder member includes a third side wall and a fourth side wall opposite each other in the second direction.

17. The vehicle according to claim 16, wherein the third side wall includes a partial opening.

18. The vehicle according to claim 17, wherein the partial opening of the first lower cell holder member and the partial opening of the first upper cell holder member combine to form a first conductor opening configured to provide passage of conductors into the first cell receiving zone.

19. The vehicle according to claim 18, wherein the partial opening of the second lower cell holder member and the partial opening of the second upper cell holder member combine to form a second conductor opening configured to provide passage of conductors into the second cell receiving zone.

20. The vehicle according to claim 11, wherein the dovetail slot spans an entirety of the first side wall in the second direction, and the dovetail projection spans an entirety of the second side wall in the second direction.

\*   \*   \*   \*   \*